(12) United States Patent
Dabney

(10) Patent No.: US 7,653,591 B1
(45) Date of Patent: Jan. 26, 2010

(54) LATE FEE AVOIDANCE SYSTEM

(76) Inventor: James W. Dabney, 376 Knollwood Rd., Ridgewood, NJ (US) 07450

( * ) Notice: Subject to any disclaimer, the term of this patent is extended or adjusted under 35 U.S.C. 154(b) by 1566 days.

(21) Appl. No.: 10/243,219

(22) Filed: Sep. 13, 2002

(51) Int. Cl.
*G06Q 40/00* (2006.01)
(52) U.S. Cl. .............................. 705/38; 705/37; 705/36; 705/35
(58) Field of Classification Search .................... 705/40, 705/35–38
See application file for complete search history.

(56) References Cited

U.S. PATENT DOCUMENTS 7,107,243 B1 * 9/2006 McDonald et al. ............ 705/40
2003/0055783 A1 * 3/2003 Cataline et al. ............... 705/40

OTHER PUBLICATIONS

The Philadelphia Inquirer Consumer Watch Column; [1] Jeff Gelles. Knight Ridder Tribune Business News. Washington: Jun. 15, 2002. p. 1.*

* cited by examiner

*Primary Examiner*—Frantzy Poinvil
*Assistant Examiner*—Clement Graham
(74) *Attorney, Agent, or Firm*—Stephen S. Rabinowitz; Henry Lebowitz; Frank E. Morris

(57) ABSTRACT

A method and apparatus are disclosed (a) which maintain credit card account and billing data including (i) data correlating credit card numbers, cardholders, and payment information such as mailing addresses or American Banking Association (ABA) routing numbers of the payee or his representative; (ii) data from which a payment due date can be determined; and (iii) means for estimating, receiving, or calculating a payment amount equal to or greater than a minimum payment amount due during a credit card's billing cycle; (b) which provide a mechanism for automatic funding of said payment amount payable during a billing cycle; and (c) which provide a mechanism for automatically issuing said payment amount to a designated payee or his representative whereby "late fees" are avoided.

36 Claims, 7 Drawing Sheets

Minimum Payment Default is 2% of Credit Limit
Customers
    CustomerID
    Name
    Address
    Phone Number
    Billing ID
Customer Accounts
    CustomerAccountID
    CustomerID
    SponsorID
    PayeeID
    Account Number
    Minimum Payment Estimation Base Balance (Default is Credit Limit)
    Minimum Payment Fixed Amount
Customer Payments Made
    PaymentMadeID
    PaymentAmount
    CustomerAccountID
    Date
Customer Payments Received
    PaymentReceivedID
    PaymentAmount
    Date
    PaymentMethod
Sponsors
    SponsorID
    Name
    Address
    Phone Number
    State of Incorporation
    Regulating Authority (e.g. OTC, Federal Reserve)
Payee
    Payee ID
    SponsorID
    Name
    Address
    Phone Number
    Wire Transfer Number
    Wire Transfer Lead Time
    Paper Check Payment Address
    Paper Check Lead Time
    Date Calculation Method ID
    Amount Calculation Method ID
    Grace Period

FIG. 3a

Date Calculation Method
  MethodID
  Description
Records:
  01 Same Date Every Month for All Customers
  02 Same Day Every Month for All Customers
  03 Same Date Based on Customer Specific Date
  04 Same Day Based on Customer Specific Date All Customer Payment Dates
  Payee ID
  Date of Month All Customer Payment Days
  Payee ID
  Day of Month Customer Payment Dates
  Payee :ID
  CustomerID
  Date of Month Customer Payment Days
  Payee ID
  CustomerID
  Day of Month Amount Calculation Method
  MethodID
  Description
Records:
  01 Fixed Amount
  02 Fixed Percentage of Current Balance
  03 Fixed Amount + Fixed Percentage of Current Balance
  04 Maximum of Fixed Amount and Fixed Percentage of Current Balance

FIG. 3b

LATE FEE AVOIDANCE SYSTEM

This invention relates to the problem of unintentionally incurred "late fees" charged by issuers of credit cards and other lenders. A method and apparatus are disclosed for eliminating or reducing "late fees" incurred by accident or oversight.

BACKGROUND OF THE INVENTION

For many years, financial institutions and sellers of consumer products have offered "revolving" lines of credit, typically extended through the issuance and use of embossed plates or plastic articles commonly referred to as "credit cards." Credit cards typically identify the name of the issuer (e.g., Visa, Sears, Amoco), the name of the card holder, a numerical account number, an expiration date, and certain other information. The terms of a credit card's use are typically set forth in a written contract entered into between the issuer and the holder of the card.

When goods or services are purchased using a credit card, the issuer of the card typically advances funds to the selling merchant on behalf of the credit card holder, less a fee charged to the merchant. The issuer then typically bills the credit card holder, at periodic intervals, for amounts that the cardholder agreed to pay for goods and services purchased using the issuer's card during a particular "billing cycle." The credit card holder is typically granted a period of time, commonly referred to as a "grace period," during which the holder can pay his or her bill in full and avoid paying any interest on funds advanced by the card issuer to merchants. Some cardholder agreements require that all credit card debt incurred during a particular billing cycle must be repaid to the issuer in full prior to the end of the "grace period." More typically, cardholder agreements permit cardholders to repay their credit card debt over time, with interest on unpaid balances due following expiration of the "grace period."

For most of the twentieth century, the rates of interest chargeable by credit Sponsors in the United States were regulated and limited by usury laws in force in many states. State usury laws typically prohibited credit Sponsors from charging more than a certain annual percentage rate ("APR") of interest on unpaid balances. Thus, prior to the late-1970's, interest on credit card debt was typically charged for and calculated similarly to interest charged on other forms of debt: card holders paid the Sponsors a specified annual percentage rate of interest on the amount of any unpaid indebtedness due following the end of a credit card's "grace period." If for any reason (including inadvertence or oversight), a cardholder did not pay his or her bill during a particular billing cycle, the unpaid balance was carried over, with accrued interest (typically referred to as a "finance charge"), to the next billing cycle, at rates of interest permitted by applicable law. Besides moderating unequal bargaining power between credit Sponsors and consumers, state usury laws provided an incentive for credit Sponsors to be prudent in credit card lending practices and to issue credit cards only to persons unlikely to default. State usury laws effectively precluded credit Sponsors from subsidizing bad debts owed by uncreditworthy cardholders with punitively high interest rates imposed on responsible cardholders.

Commencing in the late 1970's, however, state usury laws regulating credit card debt interest were challenged by credit Sponsors in litigation. In *Marquette Nat. Bank of Minneapolis v. First of Omaha Service Corp.*, 439 U.S. 299 (1978), the Supreme Court of the United States held that a civil war-era statute, the National Bank Act of 1864 (the "NBA"), entitled national banks to charge interest on credit card debt at whatever rate was allowed by the laws of the state where the bank was "located," even if that rate were considered usurious and unlawful in the state where a cardholder resided. The *Marquette* decision meant that if a state had no usury laws, or permitted extremely high rates of interest to be charged on credit card debt, a national bank "located" in such a state could charge its "home" state's rates of interest on credit card debt extended anywhere in the nation, and regardless of usury laws in force in the state of a cardholder's residence.

As a natural and predictable reaction to the Marquette decision, numerous credit Sponsors (a) segregated their credit card operations from their other business operations; (b) transferred the segregated credit card operations to federally-chartered, separately-incorporated subsidiaries or licensees "located" in states whose laws permitted extremely high, or indeed any, rate of interest to be charged on credit card debt, and (c) raised the rates of interest charged on credit card debt far above levels traditionally regarded as just or reasonable by most states. Deceptive practices were often used to convert existing cardholders to the new, higher-priced credit cards. Department stores and issuers of gasoline credit cards, for example, licensed their brand names to national banks located in "creditors' haven" states, which banks then issued solicitations for what purported to be "upgraded" department store or gasoline credit cards bearing the licensed name (e.g., AMOCO, SEARS), but which in fact were bank cards whose terms typically were drastically less favorable to cardholders than were the cards purportedly being "upgraded." By 2002, some issuers of credit cards were charging annual rates of interest on credit card debt in excess of 30% per annum.

The *Marquette* decision rested on statutory language permitting nationally chartered banks to charge loan customers "interest at the rate allowed by the laws of the State . . . where the bank is located." 12 U.S.C. § 85 (emphasis added). The charges at issue in Marquette comprised "interest" as that term was traditionally used and understood, namely, an annual percentage rate (e.g., 12%) applied to unpaid balances over a period of time. In the years following *Marquette*, however, credit Sponsors petitioned the legislatures of "creditors' haven" states to adopt a creative and non-traditional definition of "interest," with a view to attempting to extend the *Marquette* decision to various fixed charges and penalties having no relation to any time value of money conventionally defined as "interest."

For example, if a credit card holder purchased $100 worth of goods using a credit card having an APR of 21%, non-payment of the bill would traditionally have resulted in a finance charge (i.e., interest) of $1.75 ($\frac{1}{12}$ of 21% of $100) representing the time value of the unpaid balance during a billing cycle. Subsequent to Marquette, however, a number of states passed laws purporting to permit such a delinquent credit cardholder to be charged, not merely interest on the cardholder's unpaid balance due, but an additional, arbitrary sum, such as $29.00, on top of and in addition to interest charged the cardholder's unpaid indebtedness, in the event that a cardholder did not make a "minimum payment" prior to expiration of the cardholder's "grace period." This type of charge, in the nature of liquidated damages for breach of cardholder's agreement to make a "minimum payment" to a card issuer during a "grace period" extended to a cardholder, came to be referred to as a "late fee."

So-called "late fees" charged by credit Sponsors typically bear no rational relation to any loss sustained or risk borne by a credit card issuer as a consequence of the cardholder's inaction triggering the charge. "Late fees" typically are preset at fixed, arbitrary amounts and typically are charged (1)

regardless of the amount of any unpaid balance due, (2) regardless of any credit still available to the cardholder, (3) regardless of the identity or payment history of the cardholder, and (4) regardless of whether the card issuer sustains any loss or incurs any increased risk as a result of the credit cardholder's "breach." In most instances, in fact, a card issuer charging a so-called "late fee" stands ready to extend the cardholder substantial additional credit, and is already charging the cardholder interest, at the agreed upon APR, for any unpaid balance triggering imposition of a "late fee."

Contracts calling for the payment of liquidated damages or penalties, bearing no rational relation to any loss or damage sustained by a contractor in the event of a breach, have long been held unenforceable under the laws of most states; however, with the Marquette decision in mind, certain "creditors' haven" states has passed laws (a) purporting to characterize so-called "late fees" as "interest," and (b) purporting to preclude courts from finding that "late fees" are "penalties" or unenforceable, no matter what their amount. For example, Del. Code § 945 provides in pertinent part (emphasis added):

[A] bank may . . . charge and collect, as interest, . . . [a] minimum charge for each . . . scheduled billing period . . . during any portion of which there is an outstanding unpaid indebtedness due . . . .

No charges assessed by a bank in accordance with this section shall be deemed void as a penalty or otherwise unenforceable under any statute or the common law.

The legality of credit Sponsors attempts to charge "late fees" on credit card debt, in violation of state usury and consumer protection laws, was a subject of much litigation in the 1990's. In *Sherman* v. *Citibank (South Dakota), N.A.,* 668 A.2d 1036 (1995), the Supreme Court of New Jersey held that so-called "late fees" were not "interest" within the intendment and purposes of 12 U.S.C. § 85, with the result that credit Sponsors could not invoke the *Marquette* decision as a basis for charging unfair, unconscionable, or usurious "late fees" in New Jersey. The following year, however, in *Smiley* v. *Citibank (South Dakota), N.A.,* 517 U.S. 735 (1996), the Supreme Court of the United States overruled the *Sherman* decision and held that "late fees" did constitute "interest" for purposes of 12 U.S.C. § 85, and so could be charged by national bank credit Sponsors anywhere in the nation, if permitted by the laws of the state where the credit card issuer was "located."

The *Marquette* and *Smiley* decisions together invalidated virtually all state usury and commercial laws which had traditionally protected consumers against credit card charges deemed unconscionable, unfair, or usurious according to the standard of a consumer's home state. Without persuading the Congress or any state legislature to repeal a single law regulating credit card debt or lending practices, issuers of credit cards succeeded, by 1996, in persuading the federal courts to invalidate state laws which, for decades, had regulated and limited the charges which credit Sponsors could impose on consumers. Credit Sponsors were quick to take advantage of the power handed them by the *Smiley* decision.

According to published reports, between 1996 and 2002, "late fee" revenues of credit Sponsors increased from $1.7 billion to $7.3 billion annually. Between 1996 and 2002, the penalties imposed by credit Sponsors as "late fees" more than doubled, from an average of $13.28 to an average of $29.84, and ran as high as $35.00. By 2002, "late fees" were the third largest source of revenues to credit Sponsors, after interest and merchants' fees. And virtually all of these revenues resulted from accident or mistake on the part of credit cardholders, who had available financial resources which could have been applied to prevent "late fees" from being charged to them, but who lacked any practical means of deploying those resources in an automated, cost-effective, and practical manner sufficient to avoid being charged "late fees". "Late fees" represent a persistent, multi-billion dollar a year consumer problem which, for years, has eluded effective solution. There is a long-felt but unsolved need for an automated, cost-effective, reliable, and easy-to-use system for avoiding "late fees" charged by credit Sponsors.

It is, therefore, an object of this invention to provide a method and apparatus which credit card holders can use to avoid being charged "late fees," or their equivalent, by issuers of credit cards or other lenders. As used in this invention, the term "late fee" has its common and ordinary meaning in the field of credit cards and refers to a charge, typically a lump sum, imposed by a credit card issuer when a credit cardholder does not make a minimum payment on or before expiration of any grace period allowed for payment of a credit card bill. The *Smiley* decision, described above, involved a typical "late fee" of the type encompassed by the invention described herein. The term "late fee" also includes the fee charged by other lenders when a payment is not made within the time allowed for the payment.

SUMMARY OF THE INVENTION

In one embodiment of this invention, apparatus is disclosed (a) which maintains credit card account and billing data including (i) data correlating credit card numbers, cardholders, and payment information such as mailing addresses or American Banking Association (ABA) routing numbers of the payee or his representative; (ii) data from which a payment due date can be determined; and (iii) means for estimating, receiving, or calculating a payment amount equal to or greater than a minimum payment amount due during a credit card's billing cycle; (b) which provides a mechanism for automatic funding of said payment amount payable during a billing cycle, and (c) which provides a mechanism for automatically issuing said payment amount to a designated payee or his representative whereby "late fees" are avoided.

In an alternative embodiment of the invention, a computer software package is provided enabling a credit cardholder to program a general purpose computer to perform or arrange for performance of the steps identified generally above. These and other advantages of the invention are disclosed in the specific description set forth below.

In addition to practicing the invention with credit card accounts, the invention may also be practiced with all other types of billing accounts that assess late fees. Such accounts include or can include debit accounts, mortgage payment accounts, utility service accounts, insurance policies, service accounts, and the like. All such accounts including credit card accounts will be referred to as billing accounts hereinafter.

BRIEF DESCRIPTION OF THE FIGURES

FIGS. 3a and 3b schematically illustrate a preferred relational table schema of the data repository.

DETAILED DESCRIPTION

The present invention has numerous variations in its implementations. In one preferred embodiment, the present invention comprises a computerized system and method for providing an Automated Payment Service adapted to permit its customers to avoid late fees by automatically paying to the designated payee for each billing account held by the customer an amount equal to at least the typical monthly minimum payment required by payee and charging the customer for making such payments. In one embodiment, the customer has the option of paying for the payments made by arranging to have the Automated Payment Service charge one of the customer's credit cards or his bank savings or checking account. The method and system are preferably implemented so as to permit the customer to initiate and control the Automated Payment Service via a telecommunications link, such as the Internet. The Automated Payment Service preferably ensures that the customer has been charged for the payment to be made to each payee, along with a periodic fee, before transferring payment to the payee.

Figure 1:
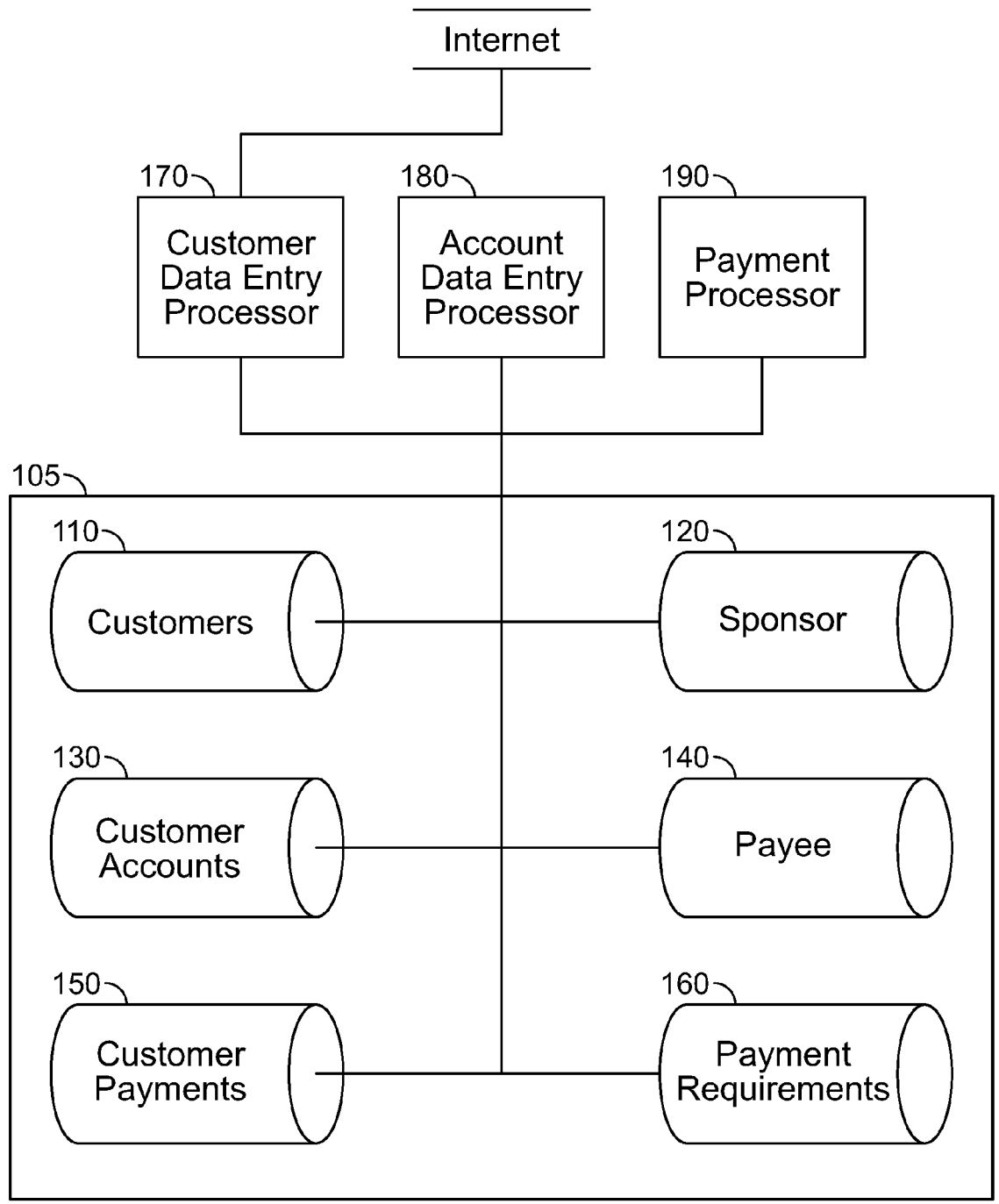
FIG. 1 schematically illustrates one aspect of the architecture of the preferred embodiment.

The architecture for one example preferred implementation of an Automated Payment Service 100 is schematically illustrated in FIG. 1. Data repository 105 comprises a number of databases or, in one preferred embodiment, relations or tables, for storing information about customers and sponsors. These databases include a customer database 110, a customer accounts database 130, a customer payments database 150, a sponsor database 120, a payee database 140 and a payment requirements database 160. Customer database 110 comprises data describing each customer, such as the customer's billing address and contact information. Customer accounts database 130 comprises data describing for each customer each customer billing account, such as the credit card issuer, the payee, if different, and the account number. Customer payments database 150 comprises data describing each payment made by the Automated Payment Service on the customer's behalf and each payment charged to the customer by the Service. Sponsors database 120 comprises data describing the sponsors of each type of billing account supported by the Service, such as the address, state of incorporation, regulating authority, and contact information for the sponsor. Typically, the sponsor of the billing account is the entity extending credit to the customer. By way of example but not limitation, this may be the credit card issuer, the utility company, the mortgage holder, the provider of goods or services. It may also include entities that strictly speaking are not extending credit but nevertheless are in a billing relationship with the customer. By way of example, these entities may include a debit card provider, an insurance company and any one else in a position to expect payment in advance of services. Payee database 140 comprises data describing payment information for each type of billing account supported by the Automated Payment Service, such as the payee, method and address for payment (e.g. wire transfer information), and an indicator of the monthly payment requirements. Typically, the payee is the sponsor but the use of separate databases for the sponsor and the payee accommodates variations in this practice. Payment requirements database 160 comprises data describing the method for calculating minimum payment amounts and minimum payment dates for each type of account and customer. Each of these databases is described in more detail below.

The Automated Payment Service preferably performs three principal types of activities: customer data entry for establishing and maintaining customer accounts; account data entry for maintaining data about each sponsor, payee and type of account supported by the system; and payment processing for periodically (typically monthly) transferring payments to payees and charging customers. These principal types of activities are performed by the customer data entry processor 170, an account data entry processor 180, and a payment processor 190, respectively. These functions may be physically performed on one or more central processing units. Preferably, data entry processor 170 may be reached via the Internet so that customers may enter and maintain their own customer data. A telephone-accessible automated interactive voice response system is preferably also used to maintain customer data.

Figure 2:
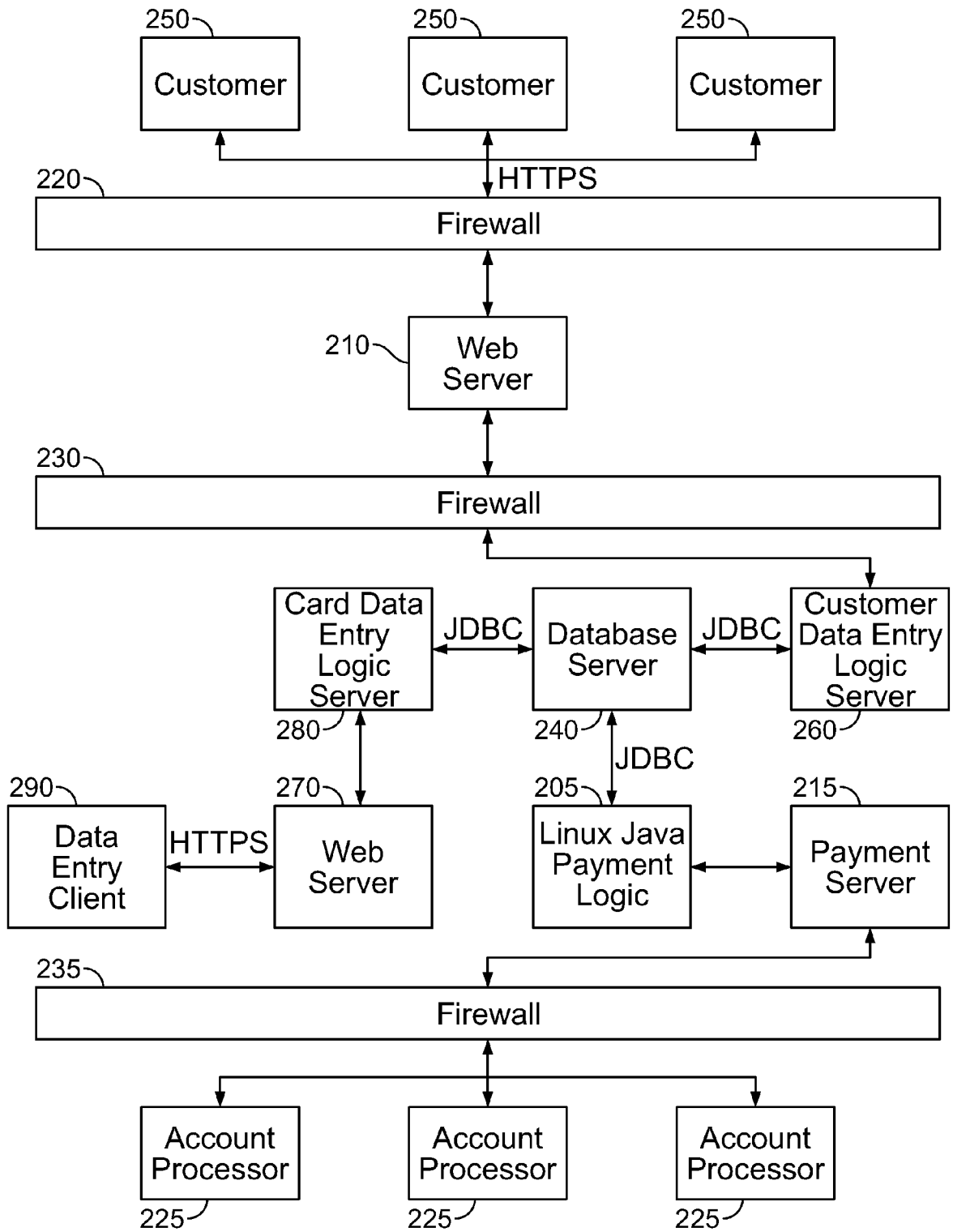
FIG. 2 schematically illustrates a second aspect of the architecture of the preferred embodiment.

Further details of a preferred implementation of the invention are schematically illustrated in FIG. 2. In this implementation, data repository 105 comprises one or more Intel-compatible computers 240 running the Linux operating system and Oracle 8i database software. Data entry processor 170 comprises one or more Intel-compatible computers 210 running the Linux operating system and a Web server with a Java Servlet engine such as the Apache Web server and Tomcat Servlet engine. The Web server computers are physically connected to the Internet and customer computers 250 through a first firewall 220 and physically connected to the remainder of the system through a second firewall, using security techniques well known to those of skill in the art. Customer data entry processor 170 further comprises one or more Intel-compatible computers 260 running the Linux operating system and a Web server with a Java Servlet engine along with Java business logic and JDBC software for interfacing with the data repository 105. Customer interactions with the data repository 105 are thus intermediated by Java business logic residing on one or more machines inside the firewall and less vulnerable to intrusion than Web server 210.

Similarly to customer data entry processor 170, account data entry processor 180 is implemented in the preferred embodiment as a Web server 270 and logic server 280 which intermediates transactions between a data entry client 290 and database server 240. Optionally, account data entry may be performed through a firewall via the Internet.

Payment processor 190 is implemented as a payment logic server 205, preferably implemented in Java, and a payment processing engine 215, preferably Go Software's RiTA server. The payment processing engine 215 communicates with account processors such as First Data Corporation Nashville, BankServ and Visa USA, banks, utility companies, insurance companies and the like, optionally via firewall 235 depending on whether the link is dedicated and secure.

A simplified database schema for the tables comprising the data repository 105 is illustrated in FIGS. 3a and 3b. Illustratively, the database comprises twelve tables: a Customer table, a Customer Accounts table, a Customer Payments Made table, a Customer Payments Received table, a Sponsors table, a Payees table, a Date Calculation Method table, an All Customer Payment Dates table, an All Customer Payment Days table, a Customer Payment Dates table, a Customer Payment Days table, and an Amount Calculation Method table.

The Customers table stores basic information about each customer. It includes for each customer a record that comprises a unique CustomerID (the primary key for the table), and the name, address, phone number, and BillingID for the customer. The BillingID is a foreign key indicating a customer account to be charged for payments made by the Automated Payment Service. Each customer record may also include information that may be useful in establishing the customer's identity such as his/her social security number, mother's maiden name, date or place of birth, or a customer chosen password.

The Customer Accounts table stores basic information about each billing account associated with each customer. For each customer and each billing account associated with that customer, the Customer Accounts table comprises a unique CustomerAccountID (the primary key for the table), a CustomerID foreign key indicating a unique record in the Customers table, a SponsoriD foreign key indicating a unique record in the Sponsors table identifying the sponsors of the billing account, a PayeeID foreign key indicating a unique record in the Payee table identifying the particular payee to which the billing account corresponds, an Account Number indicating the specific number assigned to the individual customer's billing account, such as the credit card number, a Minimum Payment Estimation Base Balance indicating the balance to be used to calculate the minimum payment for the upcoming payment period (the default value is based on the credit limit of the account), and a Minimum Payment Fixed Amount indicating the minimum fixed amount to be paid for the upcoming payment period.

The Customer Payments Made table records the payments made on behalf of a customer. For each customer and each payment made, it comprises a unique PaymentMadeID (the primary key for the table), a PaymentAmount indicating the amount of the payment, a CustomerAccountID foreign key indicating a unique record in the Customer Accounts table indicating the account to which the payment was made and a Date on which the payment was made.

The Customer Payments Received table records the payments made by each customer to the Automated Payment Service. For each customer and each payment made, it comprises a unique PaymentReceivedID (the primary key for the table), a PaymentAmount indicating the amount received from the customer, a Date indicating the date the payment was made and a PaymentMethod indicating the way in which the customer made the payment. If, for example, the customer paid the Automated Payment Service with a credit card, the payment Method would indicate a CustomerAccountID.

The Sponsors table stores basic information about each sponsor. For each sponsor, it comprises a unique SponsorID (the primary key for the table), a Name indicating the name of the sponsor, such as the issuer of the credit card, an Address of the sponsor, a Phone Number indicating the phone number of the sponsor, a State of Incorporation indicating the state of incorporation of the sponsor, and a Regulating Authority indicating a governmental body with primary regulatory authority over the sponsor (e.g. OTC, Federal Reserve).

The Payee table stores basic information about each payee. For each payee, it comprises a unique PayeeID (the primary key for the table), a SponsorID indicating record in the Sponsors table indicating the sponsor of the account, a Name indicating the name of the payee (e.g. First USA Visa), an Address of the payee for correspondence about its accounts, a Phone Number of the payee for calls about its accounts, a Wire Transfer Number including an ABA routing number and the payee's account number for transferring money to the payee for credit to customer's accounts, a Wire Transfer Lead Time indicating an estimate of the lead time required for wire transfers to be properly credited to customer's account so as to avoid late fees being incurred, a Paper Check Payment Address indicating a postal address to which checks may be sent for payment of customer's accounts, a Paper Check Lead Time indicating an estimate of the lead time for checks sent via postal mail to be properly credited to customer's accounts so as to avoid late fees being incurred, a Date Calculation Method ID foreign key indicating a unique record in the Date Calculation Method table, an Amount Calculation Method ID foreign key indicating a unique record in the Amount Calculation Method table, and a Grace Period indicating an interval during which payments may be made without incurring late fees.

The remaining tables relate to the calculation of payment due dates and minimum payments. The Date Calculation Method table comprises a unique MethodID (the primary key of the table) and a Description describing the method. The Date Calculation Method table comprises four records. A MethodID of 01 indicates that all customers holding that account have the same payment due date. A MethodID of 02 indicates that payments are due from all customers holding that account on the same day (e.g. the first Tuesday of the month). A MethodID of 03 indicates that each customer has a payment due date specific to the customer. A MethodID of 04 indicates that each customer's payment is due on a day of the month specific to that customer.

For each Payee that requires all its customers to make a minimum payment by a specified date of the month, the All Customer Payment Dates table specifies such date. For each such Payee, it comprises a PayeeID (the primary key of the table) which is also a foreign key indicating a unique record of the Payee table, and a Date of Month indicating the date of the month that payments are due for all holders of the account corresponding to the PayeeID.

For each Payee that requires all its customers to make a minimum payment by a specified day of the month, the All Customer Payment Days table specifies such day. For each such Payee, it comprises a PayeeID (the primary key of the table) which is also a foreign key indicating a unique record of the Payee table, and a Day of Month indicating the day (e.g. the first Tuesday) of the month that payments are due for all holders of the account corresponding to the PayeeID.

For each Payee that assigns different payment due dates to its customers, the Customer Payment Dates table specifies such date. For each such Payee, it comprises a PayeeID which is a foreign key indicating a unique record of the Payee table, and a CustomerID which is a foreign key indicating a unique record of the Customers table. The PayeeID and CustomerID together form the primary key of the Customer Payment Dates table. The Customer Payment Dates table further comprises a Date of Month indicating the date of the month that a payment is due on the account corresponding to PayeeID from the customer corresponding to CustomerID.

For each Payee that assigns different payment due days to its customers, the Customer Payment Days table specifies such a day. For each such Payee, it comprises a PayeeID which is a foreign key indicating a unique record of the Payee table, and a CustomerID which is a foreign key indicating a unique record of the Customers table. The PayeeID and CustomerID together form the primary key of the Customer Payment Dates table. The Customer Payment Dates table further comprises a Day of Month indicating the day (e.g. the first Tuesday) of the month that a payment is due on the account corresponding to PayeeID from the customer corresponding to CustomerID.

As will be appreciated, still other methods may be used to calculate payment due dates. These methods may be accommodated in the present invention by using additional Method IDs and Customer Payment tables to associate such methods with the Payee and Customers using such methods.

The Amount Calculation Method table comprises a unique MethodID (the primary key of the table) and a Description describing the method. The Amount Calculation Method table comprises four records. A MethodID of 01 indicates a fixed amount minimum payment is to be made each month. A MethodID of 02 indicates a that a fixed percentage of the current balance is to be paid each month. A MethodID of 03 indicates that a fixed amount plus a fixed percentage of the current balance is to be paid each month. A method ID of 04 indicates that the maximum of a fixed amount and a fixed percentage of the current balance is to be paid each month.

Figure 4:
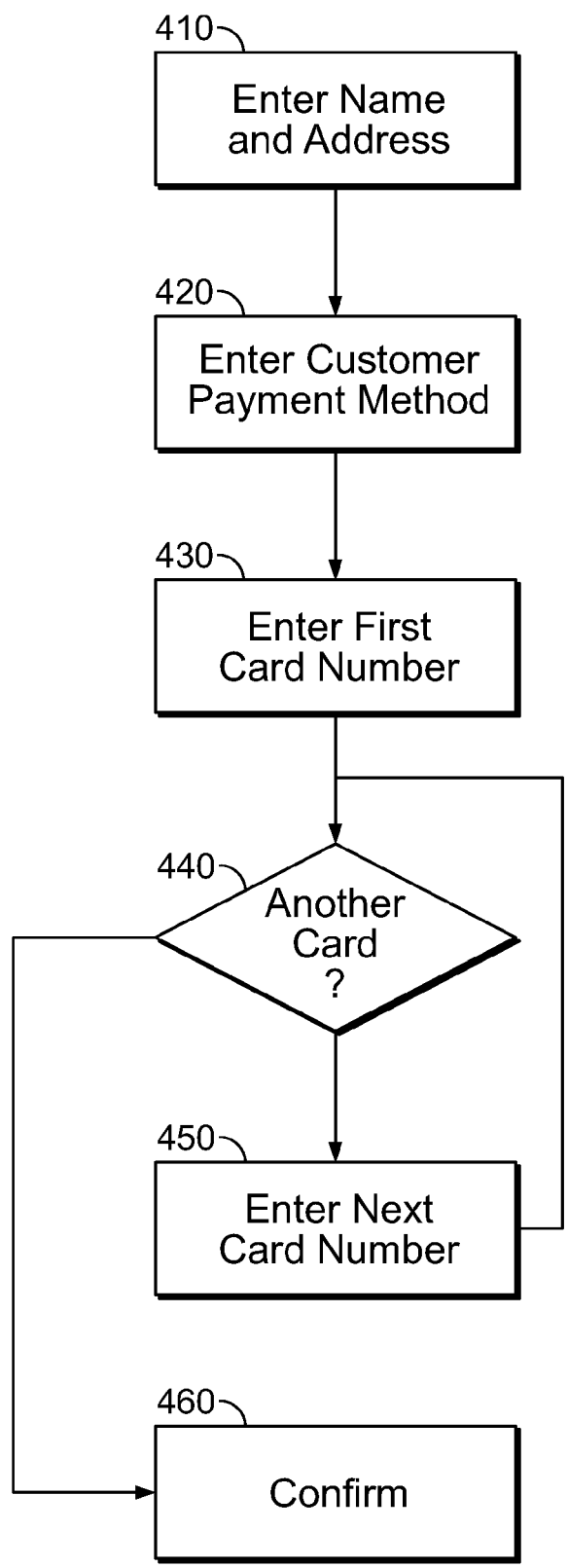
FIG. 4 schematically illustrates a preferred customer data entry interaction.

FIG. 4 schematically illustrates a user interaction with customer data entry processor 170 to enroll for automatic payment of one or more credit card accounts. At step 410, the user enters the user's name and address, which is stored in the Customers table in the Customers database 110 described above. Any additional information that may be needed to make a minimum payment is also entered. At step 420 the user enters a payment method, preferably a credit card, which causes an indicator of the payment method to the Automated Payment Service to be stored in the BillingID of the Customers table. At step 430 the user enters information about a first credit card account to be serviced by the Automated Payment Service. At a minimum, this information includes identification of the customer's credit card account and the Payee. The information should also include the method to be used to calculate the minimum payment and an indication of how the due date is calculated. Alternatively, the Automated Payment Service may obtain this information from the Payee. Where a current balance is used in calculating the minimum payment, the Automated Payment Service can use the credit limit on the account. In this case, the user must also supply the credit limit. Alternatively, customers may set a lower number if they are unlikely to reach that limit. If the minimum payment is the greater of a fixed amount and a percentage of the balance, the fixed amount can be provided by the customer or obtained from the Payee. This information is stored in a record in the Customer Accounts table.

At step 440 the user is prompted to indicate whether the user wishes to enter information about another credit card to be serviced by the system. If the answer is yes, the user proceeds to step 450 and is prompted to enter information about the next card, and then returns to step 440. If the user indicates at step 440 that the user does not wish to enter information about another card, the user is asked at step 460 to confirm the information entered.

Figure 5:
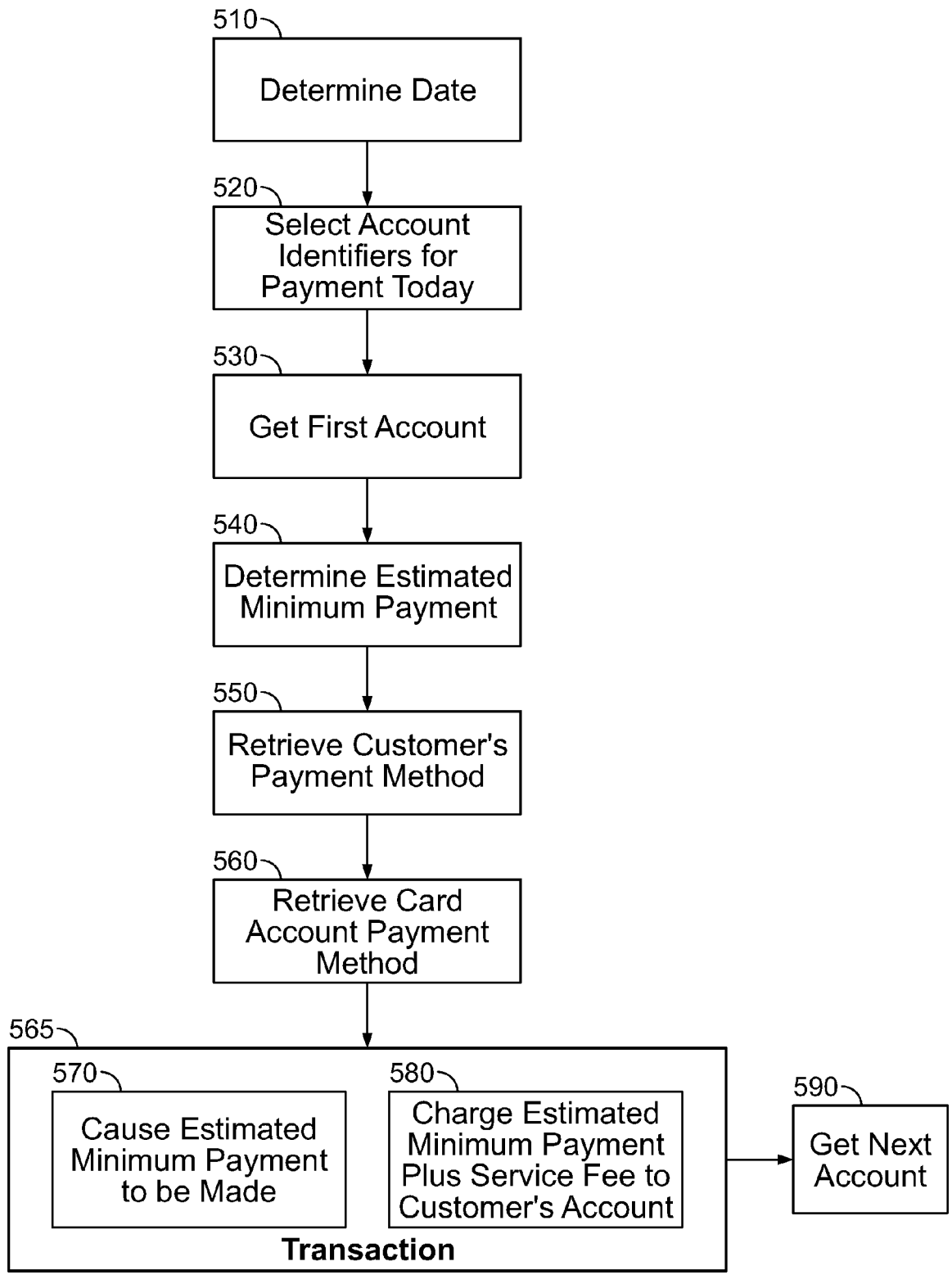
FIG. 5 schematically illustrates a preferred payment process flow.

FIG. 5 schematically illustrates a preferred operation flow for payment processor 180. In step 510, the current date is determined. Based on the current date, the system generates a SQL query that selects values of CustomerAccountID for customer accounts that should be paid on that date to avoid late fees. This query selects those accounts that have a due date minus lead time plus grace period, if any, that equals the current date. In step 530, the first account from the list returned by the query is selected for processing. In step 540, the estimated minimum payment is determined for the account based on the Amount Calculation Method for the account, the Minimum Payment Estimation Base Balance for the account, and/or the Minimum Payment Fixed Amount for the account. In step 550, the customer's payment method is retrieved from the Customers table. In step 565, a transaction processing monitor or other well-known means is invoked to process substeps 570 and 580 in an atomic, consistent, isolated, and durable manner. Substep 570 causes the estimated minimum payment for the account to be made to the Payee. Substep 580 causes the customer to be charged the amount of the estimated minimum payment plus a service fee. In step 590 the next account from the list is selected for processing.

Figure 6:
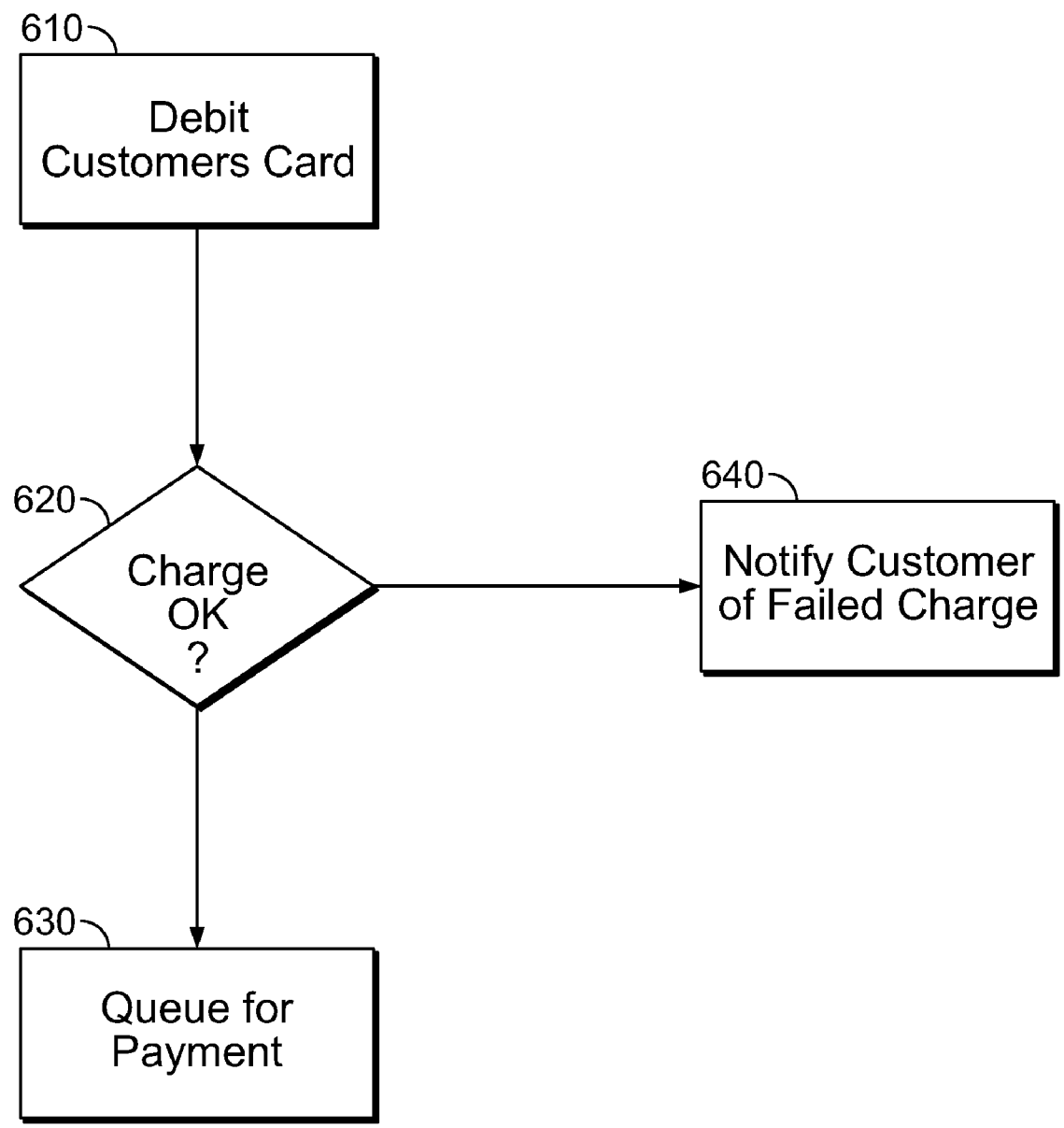
FIG. 6 schematically illustrates a preferred approach to payment transaction processing.

FIG. 6 schematically illustrates a preferred approach to processing transaction 565. In step 610, payment logic 205 causes payment server 215 to charge the credit card that the customer has indicated should be used for payment of the estimated minimum payment and the service fee for that amount. In step 620, the outcome of the charge is determined. If the charge was allowed, in step 630 the customer account is queued for payment. If the charge was not allowed, in step 640 the customer is notified that the charge was not allowed, and the customer account is not queued for payment.

Numerous methods may be used to make the minimum payments due on customers' billing accounts. Preferably, electronic payment procedures are established in advance with all Payees so that the Automated Payment Service can make minimum payments on behalf of its Customers simply by indicating to its bank the identity of the Payee and the account number and payment amount for each minimum payment to be made. Alternatively, the payments may be made by check, by wire transfer, or by authorizing the Payee to charge a bank account held by the Automated Payment Service.

In an alternative embodiment of the invention, a computer software package is provided that enables a person or organization to control a general purpose computer to perform or arrange for performance of substantially the same steps identified above. Such a computer software package may also be combined with other financial packages such as conventional bill paying packages or checking account management packages. Thus, the software package of the present invention would ensure that minimum payments are faithfully met and the customer could use conventional payment packages to pay additional amounts at his/her discretion.

Those of skill in the art will appreciate that there are many variations of the foregoing example preferred embodiment. The description above is intended to illustrate, and not to limit the invention, which is defined by the claims which follow.

What is claimed is:

1. A system for avoiding assessment of a late fee against a billing account designated by a billing account identifier, said system comprising:
one or more computer processors, said computer processors comprising computer hardware and software, said software comprising:
(i) computer instructions to cause said one or more computer processors to determine a payment amount for said billing account, said payment amount being adequate to avoid assessment of a late fee;
(ii) computer instructions to cause said one or more computer processors to store said payment amount in computer memory in linked association with said billing account identifier;
(iii) computer instructions to cause said one or more computer processors to cause funding of said payment amount utilizing credit available under said billing account;
(iv) computer instructions to cause said one or more computer processors to record said funding in computer memory in linked association with said billing account identifier;
(v) computer instructions to cause said one or more computer processors to cause payment to be made for said billing account in said payment amount no later than a due date, thereby avoiding a late fee against said billing account; and (vi) computer instructions to cause said one or more computer processors to record said payment in computer memory in linked association with said billing account identifier.

2. The system of claim 1, wherein said payment amount is automatically calculated by reference to a credit limit of said billing account.

3. The system of claim 1, wherein payment terms are recorded for said billing account.

4. The system of claim 3, wherein said payment terms include a credit limit.

5. The system of claim 3, wherein said payment terms include said due date.

6. The system of claim 3, wherein said payment terms are recorded by means of an interactive internet web site.

7. The system of claim 1, wherein said payment is made electronically to a payee of said billing account.

8. The system of claim 1, wherein the payment amount is determined in accordance with a formula.

9. A method for avoiding assessment of a late fee against a billing account for failure to make a minimum payment by a due date, said method comprising:
  a) electronically storing information for said billing account in computer memory, said information comprising a billing account identifier;
  b) electronically determining in one or more computer processors a payment amount for said billing account, said payment amount being adequate to avoid assessment of a late fee;
  c) electronically storing said payment amount in computer memory in linked association with said billing account identifier;
  d) utilizing credit available under said billing account to fund said payment amount such that said billing account is credited by said payment amount no later than the due date, thereby avoiding a late fee against said billing account;
  e) electronically recording said funding in computer memory in linked association with said billing account identifier; and
  f) electronically recording said payment in computer memory in linked association with said billing account identifier.

10. The method of claim 9, wherein said payment amount is automatically calculated by reference to a credit limit of said billing account.

11. The method of claim 9, wherein payment terms are recorded for said billing account.

12. The method of claim 11, wherein said payment terms include a credit limit.

13. The method of claim 11, wherein said payment terms include said due date.

14. The method of claim 11, wherein said payment terms are recorded by means of an interactive internet web site.

15. The method of claim 9, wherein said payment is made electronically to a payee of said billing account.

16. The method of claim 9, wherein the payment amount is determined in accordance with a formula.

17. A system for avoiding assessment of a late fee against a billing account for failure to make a minimum payment by a due date, said system comprising:
  a) means for causing information for said billing account to be stored in computer memory, said information comprising a billing account identifier;
  b) means for causing one or more computer processors to determine a payment amount for said billing account, said payment amount being adequate to avoid assessment of a late fee;
  c) means for causing said payment amount to be stored in computer memory in linked association with said billing account identifier;
  d) means for utilizing credit available under said billing account to fund said payment amount and for causing said billing account to be credited by said payment amount no later than the due date, thereby avoiding a late fee against said billing account;
  e) means for causing said funding to be recorded in computer memory in linked association with said billing account identifier; and
  f) means for causing said payment to be recorded in computer memory in linked association with said billing account identifier.

18. A system for avoiding assessment of a late fee against a billing account designated by a billing account identifier, said system comprising:
  one or more computer processors, said computer processors comprising computer hardware and software, said software comprising:
  (i) computer instructions to cause said one or more computer processors to automatically determine a payment amount for said billing account, said payment amount being selected to be less than a balance due for said billing account but adequate to avoid assessment of a late fee;
  (ii) computer instructions to cause said one or more computer processors to store said payment amount in computer memory in linked association with said billing account identifier;
  (iii) computer instructions to cause said one or more computer processors to cause automatic funding of said payment amount;
  (iv) computer instructions to cause said one or more computer processors to record said funding in computer memory in linked association with said billing account identifier;
  (v) computer instructions to cause said one or more computer processors to cause payment to be made for said billing account in said payment amount no later than a due date, thereby avoiding a late fee against said billing account; and
  (vi) computer instructions to cause said one or more computer processors to record said payment in computer memory in linked association with said billing account identifier.

19. The system of claim 18, wherein said payment amount is automatically calculated by reference to a credit limit of said billing account.

20. The system of claim 18, wherein payment terms are recorded for said billing account.

21. The system of claim 20, wherein said payment terms include a credit limit.

22. The system of claim 20, wherein said payment terms include said due date.

23. The system of claim 20, wherein said payment terms are recorded by means of an interactive internet web site.

24. The system of claim 18, wherein said payment amount is funded utilizing credit available under said billing account.

25. The system of claim 18, wherein said payment is made electronically to a payee of said billing account.

26. The system of claim 18, wherein the payment amount is determined in accordance with a formula.

27. A method for avoiding assessment of a late fee against a billing account for failure to make a minimum payment by a due date, said method comprising:
   a) electronically storing information for said billing account in computer memory, said information comprising a billing account identifier;
   b) electronically determining automatically in one or more computer processors a payment amount for said billing account, said payment amount being selected to be less than a balance due for said billing account but adequate to avoid assessment of a late fee;
   c) electronically storing said payment amount in computer memory in linked association with said billing account identifier;
   d) automatically funding said payment amount such that said billing account is credited by said payment amount no later than the due date, thereby avoiding a late fee against said billing account;
   e) electronically recording said funding in computer memory in linked association with said billing account identifier; and
   f) electronically recording said payment in computer memory in linked association with said billing account identifier.

28. The method of claim 27, wherein said payment amount is automatically calculated by reference to a credit limit of said billing account.

29. The method of claim 27, wherein payment terms are recorded for said billing account.

30. The method of claim 29, wherein said payment terms include a credit limit.

31. The method of claim 29, wherein said payment terms include said due date.

32. The method of claim 29, wherein said payment terms are recorded by means of an interactive internet web site.

33. The method of claim 27, wherein said payment amount is funded utilizing credit available under said billing account.

34. The method of claim 27, wherein said payment is made electronically to a payee of said billing account.

35. The method of claim 27, wherein the payment amount is determined in accordance with a formula.

36. A system for avoiding assessment of a late fee against a billing account for failure to make a minimum payment by a due date, said system comprising:
   a) means for causing information for said billing account to be stored in computer memory, said information comprising a billing account identifier;
   b) means for causing one or more computer processors to automatically determine a payment amount for said billing account, said payment amount being selected to be less than a balance due for said billing account but adequate to avoid assessment of a late fee;
   c) means for causing said payment amount to be stored in computer memory in linked association with said billing account identifier;
   d) means for automatically funding said payment amount and for causing said billing account to be credited by said payment amount no later than the due date, thereby avoiding a late fee against said billing account;
   e) means for causing said funding to be recorded in computer memory in linked association with said billing account identifier; and
   f) means for causing said payment to be recorded in computer memory in linked association with said billing account identifier.

* * * * *

UNITED STATES PATENT AND TRADEMARK OFFICE
CERTIFICATE OF CORRECTION

| | | |
|---|---|---|
| PATENT NO. | : 7,653,591 B1 | Page 1 of 1 |
| APPLICATION NO. | : 10/243219 | |
| DATED | : January 26, 2010 | |
| INVENTOR(S) | : James W. Dabney | |

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 1,566 days.

should read (*) Notice: Subject to any disclaimer, the term of this patent is extended or adjusted under 35 U.S.C. 154(b) by 2,236 days.

Signed and Sealed this

Thirty-first Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,653,591 B1  
APPLICATION NO. : 10/243219  
DATED : January 26, 2010  
INVENTOR(S) : James W. Dabney It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2967 days.

Signed and Sealed this

Twenty-third Day of November, 2010

David J. Kappos  
*Director of the United States Patent and Trademark Office*